UNITED STATES PATENT OFFICE.

OSKAR KINDERMANN, OF LINDENAU, GERMANY, ASSIGNOR TO HENRY WILLFORD, OF KINGSTON, ENGLAND.

MANUFACTURE OF LITHOGRAPHIC PLATES.

SPECIFICATION forming part of Letters Patent No. 445,650, dated February 3, 1891.

Application filed September 16, 1890. Serial No. 365,165. (No specimens.)

*To all whom it may concern:*

Be it known that I, OSKAR KINDERMANN, a subject of the Empire of Germany, residing at Lindenau, Leipsic, in the Empire of Germany, have invented certain new and useful Improvements in the Manufacture of Lithographic Plates, of which the following is a specification.

Zinc plates are prepared by being passed over a fine-sand blast until their surface is uniformly dull. They are then washed with a sponge dipped in clean water having in it a few drops of the following mixture: chloride of zinc, tetrachloride of tin, nitric acid, hydrochloric acid, and water. The moisture is wiped off with blotting-paper or similar material, and the same mixture is then applied with a fine sponge and spread evenly over the surface by a brush applied softly in long strokes until the surface is dry. When the plate is dry, the dust on the surface is removed with a soft brush, and it will be found that the mixture has combined with the zinc of the plate to form a surface which can be used for any purpose in lithographic printing for which stones are used.

The advantages of these plates are that they cost very much less than the cheapest lithographic stone, that they are lighter and easier to work with, take up less room and capital for storing, and produce results equal to the best stone.

The following proportions work well: chloride of zinc, one hundred parts; tetrachloride of tin, twenty-five parts; nitric acid, two parts, hydrochloric acid, two parts; water, twelve hundred parts.

What I claim is—

1. The process of manufacturing lithographic plates by treating zinc sheets with a solution containing chloride of zinc and tetrachloride of tin.

2. The process of manufacturing lithographic plates by treating zinc sheets with a mixture of chloride of zinc, tetrachloride of tin, nitric acid, hydrochloric acid, and water, in about the proportions specified.

3. The process of manufacturing lithographic plates by first dulling zinc sheets and then brushing them with a mixture of chloride of zinc, tetrachloride of tin, nitric acid, hydrochloric acid, and water, in about the proportions specified.

OSKAR KINDERMANN. [L. S.]

Witnesses:
CARL BORNGRAEBER,
CARL HERMANN SCHRÜ.